ROBERT BLACKLIDGE, OF BRIDGEPORT, CONNECTICUT, ASSIGNOR TO HIMSELF AND CHARLES GERDENIER.

Letters Patent No. 88,537, dated April 6, 1869.

IMPROVED TONIC BITTERS.

The Schedule referred to in these Letters Patent and making part of the same.

*To all whom it may concern:*

Be it known that I, ROBERT BLACKLIDGE, of Bridgeport, in the county of Fairfield, and State of Connecticut, have invented new Tonic Bitters; and I do hereby declare the following to be a full, clear, and exact description of the same.

This invention, designed for use as tonic bitters, is also applicable in the manufacture of ale, beer, porter, &c., imparting to the same the benefits of a tonic, as well as a pleasant bitter taste; and The invention consists in the combination of picric acid and cochineal with wine, ale, beer, &c.

I will proceed to describe my process of preparation, in order that others familiar with the art, may be able to compound the same.

For what are termed tonic bitters, I take, of picric acid, (crystal,) thirteen parts, cochineal, one part, and dissolve these in wine, brandy, or other suitable spirits, of about four times the weight of the acid and cochineal.

Thus prepared, a small quantity is used in a glass of wine or liquor, in similar manner as other bitters.

The picric acid possesses many of the qualities of quinine, but without the injurious effects to the system that the use of quinine is liable to produce, and the bitters thus prepared have been found, in practice, an efficient and valuable remedy for the cure of chills and fever, as well as for a tonic.

For the use of brewers, as in the preparation of ale and porter, I take picric acid and cochineal, in the proportions aforesaid, and grind them to powder, and add the same to the ale, beer, or porter proportions, according to the taste and strength required, but should not exceed one and one-half grain of powder to each imperial pint of ale, beer, or porter. Experienced brewers will readily understand the adding of this bitter to the taste, as different brewers produce liquors of different degrees of bitterness.

Having described my invention,

What I claim as new and useful, and desire to secure by Letters Patent, is—

The bitters produced by the combination of the ingredients, substantially in the manner herein described.

ROBERT BLACKLIDGE.

Witnesses:
   JOHN OLDROYD,
   ABRAM SPURR.